(12) United States Patent
Stenberg

(10) Patent No.: US 12,360,305 B2
(45) Date of Patent: Jul. 15, 2025

(54) OPTICAL WAVEGUIDE FOR AUGMENTED REALITY DISPLAY

(71) Applicant: DISPELIX OY, Espoo (FI)

(72) Inventor: Petri Stenberg, Espoo (FI)

(73) Assignee: DISPELIX OY (FI)

( * ) Notice: Subject to any disclaimer, the term of this patent is extended or adjusted under 35 U.S.C. 154(b) by 308 days.

(21) Appl. No.: 18/246,147

(22) PCT Filed: Sep. 20, 2021

(86) PCT No.: PCT/FI2021/050617
§ 371 (c)(1),
(2) Date: Mar. 21, 2023

(87) PCT Pub. No.: WO2022/064101
PCT Pub. Date: Mar. 31, 2022

(65) Prior Publication Data
US 2023/0384503 A1    Nov. 30, 2023

(30) Foreign Application Priority Data
Sep. 23, 2020   (FI) ...................................... 20205920

(51) Int. Cl.
*G02B 1/10*     (2015.01)
*F21V 8/00*     (2006.01)
*G02B 27/01*    (2006.01)
*G02B 5/18*     (2006.01)

(52) U.S. Cl.
CPC ............. *G02B 6/0016* (2013.01); *G02B 1/10* (2013.01); *G02B 6/0038* (2013.01); *G02B 27/0172* (2013.01); *G02B 5/1857* (2013.01)

(58) Field of Classification Search
CPC ........................................................ G02B 6/16
See application file for complete search history.

(56) References Cited

U.S. PATENT DOCUMENTS

| | | | |
|---|---|---|---|
| 2016/0033784 A1* | 2/2016 | Levola ............... | G02B 27/4205 385/37 |
| 2018/0024289 A1* | 1/2018 | Fattal .................. | G02B 6/0028 362/601 |
| 2019/0129088 A1* | 5/2019 | Lu ....................... | G02B 27/0101 |
| 2020/0018875 A1* | 1/2020 | Mohanty ............. | H01L 21/3086 |
| 2020/0110206 A1* | 4/2020 | Rahomäki ......... | B29D 11/00769 |
| 2020/0110278 A1* | 4/2020 | Yang ................... | G02B 27/4272 |

\* cited by examiner

*Primary Examiner* — Chris H Chu
(74) *Attorney, Agent, or Firm* — Edmonds & Cmaidalka, P.C.

(57) ABSTRACT

This document discloses a solution for an optical waveguide for an augmented reality display device. According to an aspect, the optical waveguide comprises: a substrate arranged to guide an optical image inside the substrate from an inlet to an outlet of the optical waveguide via a plurality of reflections; a surface relief grating at the inlet or the outlet of the optical waveguide, the surface relief grating guiding the image in the optical waveguide via diffraction and comprising a plurality of grooves; a coating disposed on the surface relief grating and filling at least partially at least one groove disposed at an edge of the surface relief grating where the image is coincident with the at least one groove after a first reflection of the image inside the substrate, the coating having optical characteristics convergent with optical characteristics of the substrate.

11 Claims, 2 Drawing Sheets

OPTICAL WAVEGUIDE FOR AUGMENTED REALITY DISPLAY

TECHNICAL FIELD

Embodiments of the present invention relates to a field of display devices used in augmented reality (AR) devices. In particular, the embodiments relate to improving image quality in such devices.

TECHNICAL BACKGROUND

In augmented reality displays, e.g. eyewear or a head-mounted display, an image is delivered from a projector to a user's eye (or eyes) via an optical waveguide. The optical waveguide may comprise a surface relief grating at an inlet and at an outlet of the optical waveguide. The surface relief grating at the inlet guides incoming light (or image) from the projector towards the outlet via diffraction. Similarly, the surface relief grating at the outlet directs the light out from the optical waveguide towards the eye. Because of the dimensions, some components diffracted light may be incident on the surface relief grating after entering the optical waveguide via the surface relief grating at the inlet. Such an incident may cause dispersion of the incident light and reduce sharpness of the image.

US 2020/018875 discloses techniques for fabricating slanted surface-relief structures. In some embodiments, a method for of fabricating a target slanted surface-relief structure, such as a nanoimprint lithography (NIL) mold or a slanted surface-relief grating, includes manufacturing a preliminary surface-relief structure that includes a plurality of ridges and modifying a parameter of the preliminary surface-relief structure to make the target slanted surface-relief structure. The parameter includes a width of each of the plurality of ridges, a height of each of the plurality of ridges, a surface energy of the preliminary surface-relief structure, or a slant angle of an edge of the plurality of ridges. Modifying the parameter includes depositing a material layer on the preliminary surface-relief structure and etching or surface-treating the material layer.

US 2017/307886 discloses a waveguide configured for use with a near-eye display (NED) device. It can include a light-transmissive substrate configured to propagate light rays through total internal reflection and a diffractive optical element (DOE) on a surface of the substrate that is configured to input and/or output light rays to and/or from the substrate. According to some embodiments the DOE can include a diffraction grating made of first material having a first refractive index and a coating of a second material over the diffraction grating, the second material having a second refractive index that is not equal to the first refractive index.

BRIEF DESCRIPTION

The present invention is defined by the subject matter of the independent claims.

Embodiments are defined in the dependent claims.

The embodiments and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the accompanying drawings, in which.

DESCRIPTION OF THE EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
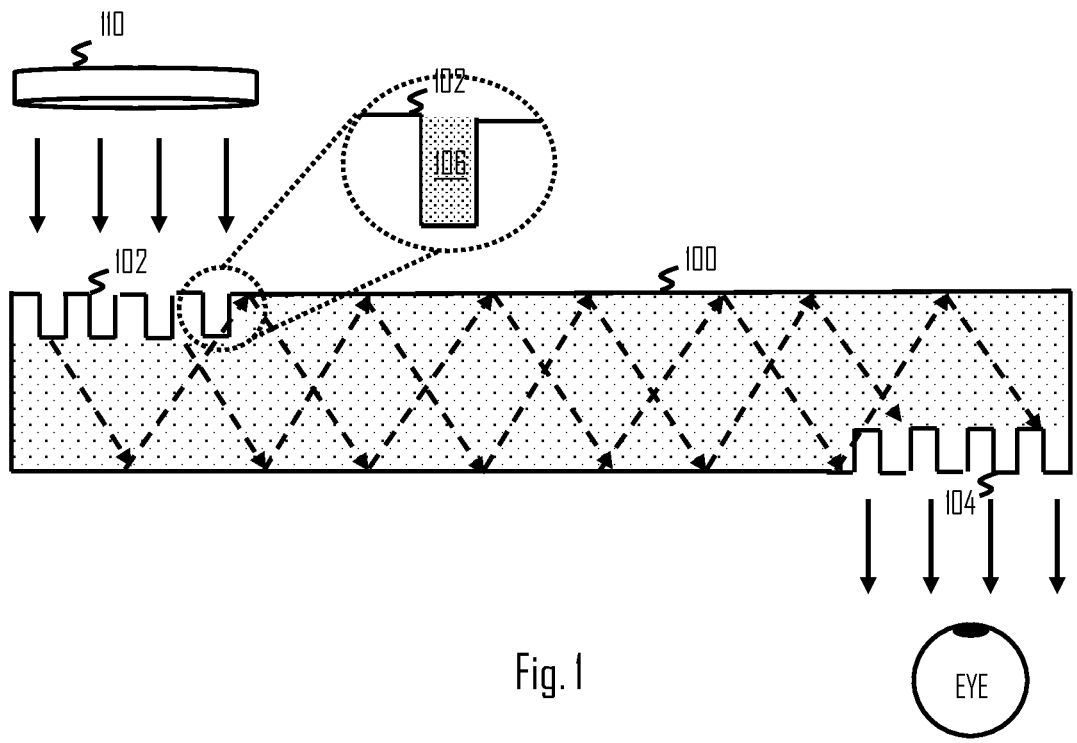
FIG. 1 illustrates an optical waveguide with a surface relief grating coated according to an embodiment.

FIG. 1 illustrates an optical waveguide for an augmented reality display device, such as augmented reality eyewear or a head-mounted display. The eyewear may look like glasses, spectacles or goggles, for example. The eyewear or the head-mounted display may be in connection with a head-wear like a cap, a hat or a helmet, for example. An optical image is projected into an inlet of the optical waveguide by a projector 110. The image may be a still image or video. The image travels inside the optical waveguide via total reflections from the inlet to an outlet, as illustrated by the dashed arrows in FIG. 1. The travel of the light or image is thus similar to the light travelling inside an optical fibre. The optical waveguide comprises: a substrate 100 arranged to guide an optical image inside the substrate from the inlet to the outlet of the optical waveguide via a plurality of (total) reflections; a surface relief grating (SRG) 102, 104 at the inlet or the outlet of the optical waveguide, the surface relief grating guiding the image in the optical waveguide via diffraction and comprising a plurality of grooves; a coating 106 disposed on the surface relief grating and filling at least partially at least one groove disposed at an edge of the surface relief grating where the image is coincident with the at least one groove after a first reflection of the image inside the substrate 100, the coating 106 having optical characteristics convergent with optical characteristics of the substrate 100.

As known in the art, a surface relief grating is grating having alternating microscopic grooves and ridges to form a diffractive grating splitting light incident on the grating into multiple diffraction orders.

As described in Background, the dimensions of the optical waveguide may be such that the light is bound to coincide with the edge(s) of the SRG. Typically, a first order of diffraction is arranged to travel through the optical waveguide. The thickness or width of the substrate may be so thin with respect to the width of the SRG that the light of the first order does diffract in high enough an angle to avoid coinciding with the edges of the SRG. This is illustrated in FIG. 1 by the leftmost dashed arrow that travels upwards and coincides with the groove at the edge of the SRG 102. Similarly, another reflection component coincides with an edge of the SRG 104 at the outlet of the optical waveguide. There may be other reasons to the phenomenon where the light is coincident with the groove after the inlet of the light to the substrate and/or before the outlet of the light from the substrate.

The coating provides the technical effect that scattering of the light incident on the groove after the first reflection can be reduced. This spans from the converging optical properties of the coating and the substrate. The light travelling inside the substrate and coinciding with the groove is also incident on the coating and, thanks to the converging optical properties, e.g. the refractive index, the may light travel substantially unscattered through the coating. Furthermore, since the coating effectively narrows the groove or even fills the groove in some embodiments, the light does not coincide with an optical barrier and does not disperse, or at least the dispersion is reduced.

In an embodiment, the optical waveguide described herein is comprised in an augmented reality eyewear. The eyewear may comprise, in addition to the optical waveguide according to any embodiment described herein, the projector 110 configured to output an optical image and a lens (not shown) configured to relay the optical image to the SRG at the inlet of the optical waveguide. The lens may be a part of the projector, for example.

It should be appreciated that the optical waveguide illustrated in FIG. 1 is a simplified illustration, and certain features of the waveguide have been enlarged to illustrate the technical effect of the described embodiments. For example, the thickness of the substrate may be substantially smaller than illustrated. It should also be appreciated that the dimensions and design of the SRGs may differ from what is illustrated. For example, some SRGs have slanted grooves, and the embodiments are directly applicable to such designs as well.

The converging optical characteristics may be understood such that the light incident on the groove and the coating therein experiences the coating as optically similar to the substrate from which the light coincides with the coating. Since the light 'sees' no or little optical boundary, the scattering can be reduced. Therefore, the coating material may be designed from this perspective. This distinguishes from other coatings potentially used to cover the optical waveguides, e.g. anti-glare coatings that have varying, uncontrolled characteristics in terms of optical convergence with the substrate.

In an embodiment, the optical characteristics such as the refractive index of the coating are unitary with the optical characteristics of the substrate.

In an embodiment, the coating has at least one layer having a refractive index substantially equal to a refractive index of the substrate. The at least one layer having the refractive index substantially equal to the refractive index of the substrate may be directly in contact with the substrate. The coating may have another layer (on top of the at least one layer) that has another refractive index.

In yet another embodiment, the at least one layer may comprise multiple layers where neither layer has a refractive index equal to the refractive index of the substrate, but a combined refractive index of the multiple layers may equal to the refractive index of the substrate. For example, a first layer disposed directly on top of the substrate may be tin dioxide $TiO_2$ having a refractive index of 2.4. A second layer disposed on the first layer may be aluminium dioxide $AlO_2$ having a refractive index 1.7, and a combined refractive index of the first layer and the second layer may thus be between 2.4 and 1.7. and it can be tailored according to the required optical characteristics. Such a multilayer coating is not limited to described materials or layers but can be freely tailored from two or more materials. The properties of the materials and the respective layers may be designed such that the convergence of the optical characteristics with the substrate is achieved, e.g. such that the (combined) refractive index of the coating is substantially equal to the refractive index of the substrate, e.g. 2.0.

In an embodiment, the coating comprises first coating material having a first refractive index and second coating material having a second refractive index different from the first refractive index.

Figure 2:
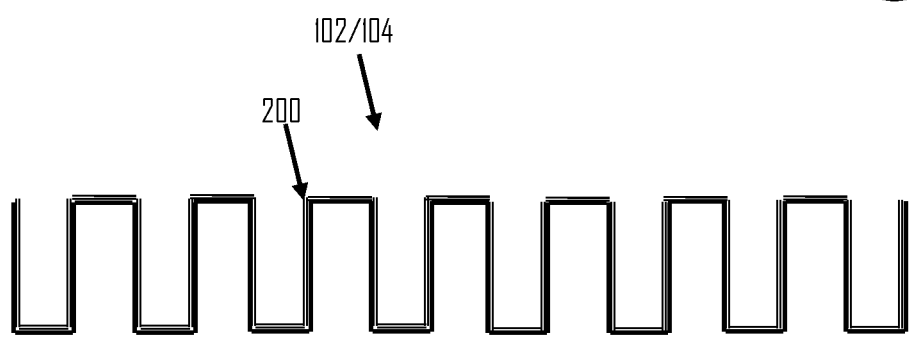
FIG. 2 illustrates coating of a surface relief grating according to an embodiment.

As illustrated in FIG. 1, the at least one groove coated with the coating may be disposed at the edge of the surface relief grating where a first order diffraction of the image is coincident with the at least one groove. The image may be coincident with at least the groove that is the edge-most of the SRG towards the outlet (when the image is incident with the SRG at the inlet) or towards the inlet (when the image is incident with the SRG at the outlet). Depending on the implementation, the image may be coincident with multiple grooves at the edge of the SRG and, accordingly, multiple grooves may be coated with the coating. In an embodiment, the whole SRG is coated with the coating. FIG. 2 illustrates such an embodiment where the SRG(s) 102, 104 are coated with coating that fills the grooves partially. The coating thus optically narrows the groove, resulting in the technical effect mentioned above.

In an embodiment, the coating completely fills the at least one groove, as illustrated in FIG. 1 by the coating 106.

Figure 3:
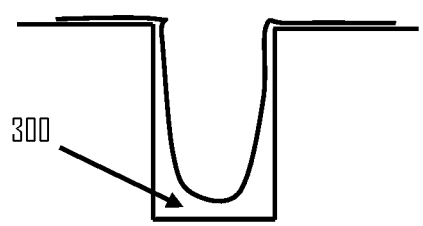
FIG. 3 illustrates uneven coating in a groove of a surface relief grating according to an embodiment.

In an embodiment, the thickness of the coating in the groove varies in the groove(s), as illustrated by the coating 300 in FIG. 3. When the coating is disposed on the SRG and the groove(s), the viscosity and other deposition-related physical properties of the coating may affect how evenly the coating fills the edges of the groove(s). It may be beneficial to select a coating that gutters to the bottom of the groove(s), thus forming a thicker coating on the bottom of the groove(s) than on the walls of the groove(s). The light incident with the groove(s) coincides at least the bottom of the groove(s), and the thicker layer of coating at the bottom may provide for less dispersion. In this embodiment, the coating thus only partially fills the groove(s), including the edge-most groove where the first order diffraction of the image is coincident with the edge-most groove.

In an embodiment, the coating is used, together with the dimensions of the grooves of the SRG(s) to control the dispersion. The dispersion may be reduced by reducing the dimensions of the grooves gradually from the centre of the SRG towards the edge(s) of the SRG. In other words, the dimensions of the groove(s) at the edge of the SRG may be smaller than dimensions of the grooves of the SRG at the centre of the SRG. The width and/or the depth of the grooves may gradually reduce towards the edge of the SRG. This optically 'fades' the edge of the SRG, thus reducing the dispersion of the light coincident with the groove(s) after the first reflection inside the substrate 100. The grooves may be made by employing lithography, and there may be limits to how narrow a groove can be made. Therefore, using the coating as a further tool to control the effective dimensions of the grooves may help in reducing the scattering.

Figure 4:
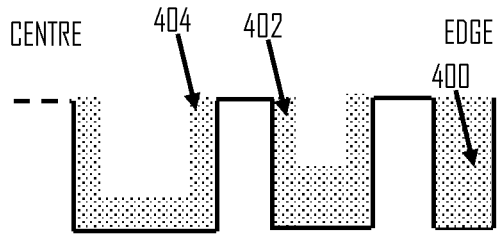
FIG. 4 illustrates uneven deposition of coating on a surface relief grating according to an embodiment.

In an embodiment, the coating fills a plurality of grooves of the surface relief grating unevenly. FIG. 4 illustrates such an embodiment where the coating fills some of the grooves of the SRG completely and some of the grooves only partially. Referring to FIG. 4, the coating may completely fill at least a first groove 400 of the SRG and partially fills at least a second groove 402/404 of the SRG, wherein the first groove 400 is closer to the edge of the SRG than the second groove 402/404, and wherein the second groove 402/404 is wider than the first groove 400.

Figure 5:
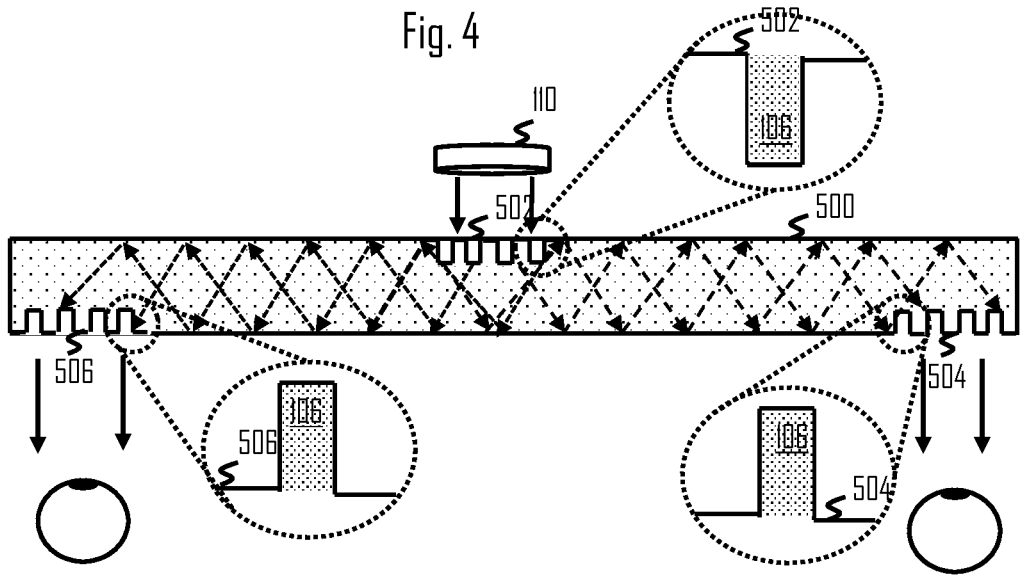
FIG. 5 illustrates an optical waveguide with a surface relief grating coated according to another embodiment.

As described in connection with FIG. 1, the coating may be provided at least on the SRG at the inlet of the optical waveguide. According to another aspect, the coating is provided at least on the SRG at the outlet of the optical waveguide. According to yet another aspect, the coating is provided on both the inlet and the outlet SRG. Both SRGs guide the image in the optical waveguide via diffraction and comprise a plurality of grooves. The coating is disposed on said both surface relief gratings and filling at least partially at least one groove disposed at edges of the surface relief gratings where the image is coincident with the at least one groove after the first reflection of the image inside the substrate. FIG. 5 illustrates such an embodiment.

Referring to FIG. 5, the SRG 502 at the inlet of the optical waveguide may be coated with the coating material 106 according to any one of the above-described embodiments. In a similar manner, the SRG 504 at the outlet and towards a first direction from the inlet along the waveguide may be coated with the coating material 106 according to any one of the above-described embodiments. In the embodiment of FIG. 5, there is a further, second outlet comprising a further SRG 506. The second outlet may be to the opposite direction from the inlet SRG 502. In the inlet SRG 502, the image is inherently diffracted to both, opposite directions as known in the optics. In the embodiment of FIG. 1, the diffraction to the other direction away from the outlet is not employed while it is employed in the embodiment of FIG. 5, as illustrated by the arrows towards both outlets from the inlet. The SRG 506 at the second outlet may also be coated according to any one of the above-described embodiments.

It should be appreciated that, when the coating is unevenly disposed on the SRG, the deposition of the coating may be mirrored at the outlet SRGs with respect to the inlet SRG. In other words, the coating may be disposed at least on the grooves where the light is incident with the groove inside the substrate 500 (see highlighted grooves in FIG. 5. Further grooves from the highlighted edge of the SRG towards the centre(s) of the SRG(s) may also be coated, as described above.

It should also be appreciated that, in other embodiments, there may be one or more further inlets and/or outlets with respective SRG(s), and it/they may also be coated according to the principles described above.

Figure 6:
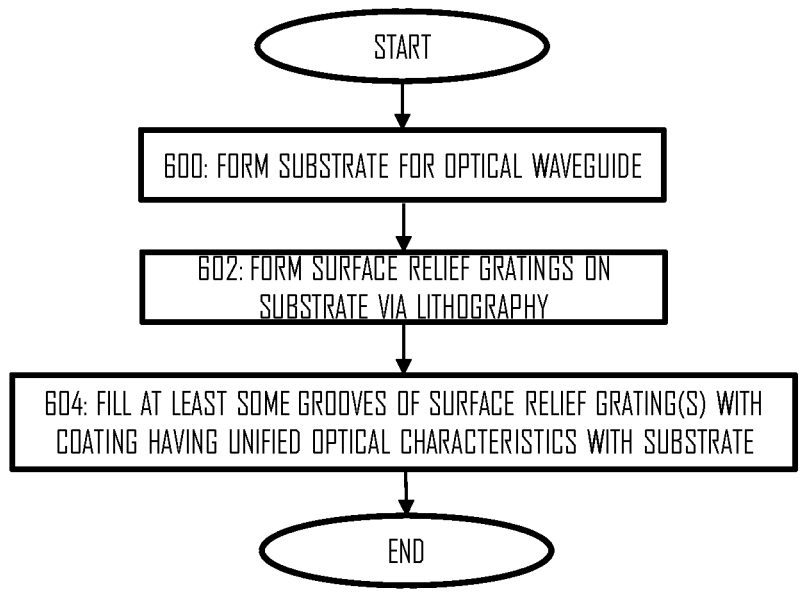
FIG. 6 illustrates a method for manufacturing an optical waveguide according to an embodiment.

Let us then describe a method for manufacturing the optical waveguide according to any one of the above-described embodiments with reference to FIG. 6. Such a manufacturing method comprises according to an embodiment: forming (block 600) a substrate arranged to guide an optical image inside the substrate from an inlet to an outlet of the optical waveguide via a plurality of reflections; forming (block 602) a surface relief grating to the inlet of the optical waveguide, the surface relief grating guiding the image to the substrate via diffraction and comprising a plurality of grooves; and filling (block 604) with a coating at least partially at least one groove disposed at an edge of the surface relief grating where the image is coincident with the at least one groove after a first reflection of the image inside the optical waveguide, the coating having a refractive index that optically narrows the at least one groove and thus reduces scattering of the image incident on the at least one groove after the first reflection.

In an embodiment, the surface relief grating is formed by using lithography on the substrate.

The coating may be disposed in block 604 according to any state-of-the-art coating method. Examples of possible coating methods include atomic layer deposition, spin coating, chemical vapor deposition, physical vapor deposition, and spray coating.

In an embodiment, said filling is performed such that the coating completely fills the at least one groove, according to the embodiment of FIG. 1.

In an embodiment, said filling is performed such that the coating forms a thicker layer on the bottom of the at least one groove than on walls of the at least one groove, as in the embodiment of FIG. 3.

In an embodiment, said forming the surface relief grating comprises forming grooves of the surface relief grating such that dimensions of the grooves reduce gradually towards an edge of the surface relief grating, and wherein said filling is performed such that the coating fills the grooves of the surface relief grating unevenly, e.g. as illustrated in FIG. 4.

In an embodiment, block 602 comprises forming SRGs on a plurality of outlets on the substrate and filling the groove(s) of the inlet SRG(s) and outlet SRGs in block 604, as illustrated in Figure S.

It will be obvious to a person skilled in the art that, as the technology advances, the inventive concept can be implemented in various ways. The invention and its embodiments are not limited to the examples described above but may vary within the scope of the claims.

The invention claimed is:

1. An optical waveguide for an augmented reality display device, comprising:
    a substrate arranged to guide an optical image inside the substrate from an inlet to an outlet of the optical waveguide via a plurality of reflections;
    a surface relief grating at the inlet or the outlet of the optical waveguide, the surface relief grating guiding the image in the optical waveguide via diffraction and comprising a plurality of grooves; and
    a coating disposed directly on the surface relief grating and filling at least partially at least an edge-most groove of the surface relief grating where a first order diffraction of the image is coincident with the at least edge-most groove, the coating having a refractive index convergent with a refractive index of the substrate, wherein the coating fills a plurality of grooves of the surface relief grating unevenly such that the coating completely fills at least a first groove of the surface relief grating and partially fills at least a second groove of the surface relief grating, wherein the first groove is closer to the edge of the surface relief grating than the second groove, and wherein the second groove is wider than the first groove, wherein the coating together with groove widths of the surface relief grating cause the grooves of the surface relief grating to provide a gradually narrowing optical groove widths towards the edge of the surface relief grating.

2. The optical waveguide of claim 1, wherein the coating has at least one layer having the refractive index substantially equal to the refractive index of the substrate.

3. The optical waveguide of claim 2, wherein the coating comprises first coating material having a first refractive index and second coating material having a second refractive index different from the first refractive index where neither the first refractive index nor the second refractive index is substantially equal to the refractive index of the substrate but that the first coating material together with the second coating material provide the refractive index substantially equal to the refractive index of the substrate.

4. The optical waveguide of claim 1, wherein the coating completely fills said at least the edge-most groove.

5. The optical waveguide of claim 1, comprising surface relief gratings at the inlet and the outlet of the optical waveguide, both surface relief gratings guiding the image in the optical waveguide via diffraction and comprising a plurality of grooves, wherein the coating is disposed on at least the edge-most grooves of said both surface relief gratings and filling at least partially the edge-most grooves of the surface relief gratings where the first order diffraction of the image is coincident with the edge-most grooves.

6. The optical waveguide of claim 1, wherein the coating (106) disposed directly on the surface relief grating at the inlet and filling at least partially the at least one groove disposed at an edge-most groove of the inlet surface relief grating where a first order diffraction of the image is coincident with the at least one groove, the edge being towards the outlet.

7. The optical waveguide of claim 1, wherein said outlet is a first outlet and the optical waveguide further comprises a second outlet at an opposite direction from the inlet than the first outlet, the second outlet also provided with a surface relief grating, wherein the coating fills at least partially at least the edge-most groove at both edges of the surface relief grating at the inlet, where the first order diffraction of the image at the inlet towards the first outlet and the second outlet is coincident with the edge-most grooves at the edges of the inlet surface relief grating.

8. An augmented reality eyewear, comprising:
   the optical waveguide according to claim 1;
   a projector configured to output an optical image; and
   a lens configured to relay the optical image to the surface relief grating at the inlet of the optical waveguide.

9. A method for manufacturing an optical wave guide, comprising:

forming a substrate arranged to guide an optical image inside the substrate from an inlet to an outlet of the optical waveguide via a plurality of reflections;

forming a surface relief grating to the inlet or the outlet of the optical waveguide, the surface relief grating guiding the image to the substrate via diffraction and comprising a plurality of grooves; and filling with a coating at least partially at least the edge-most groove of the surface relief grating where a first order diffraction of the image is coincident with the at least one groove, the coating having a refractive index that optically narrows said at least the edge-most groove and thus reduces scattering of the image incident on said at least the edge-most groove incident with the first order diffraction, wherein the coating fills a plurality of grooves of the surface relief grating unevenly such that the coating completely fills at least a first groove of the surface relief grating and partially fills at least a second groove of the surface relief grating, wherein the first groove is closer to the edge of the surface relief grating than the second groove, and wherein the second groove is wider than the first groove, wherein the coating together with groove widths of the surface relief grating cause the grooves of the surface relief grating to provide a gradually narrowing optical groove widths towards the edge of the surface relief grating.

10. The method of claim 9, wherein the surface relief grating is formed by using lithography.

11. The method of claim 9, wherein said filling is performed such that the coating completely fills the at least edge-most groove.

* * * * *